July 10, 1962  P. JEAN-MARIE THEODORE ALLARD  3,043,029
EXCAVATING MACHINE NOTABLY FOR DIGGING TRENCHES
Filed Sept. 3, 1959  2 Sheets-Sheet 1
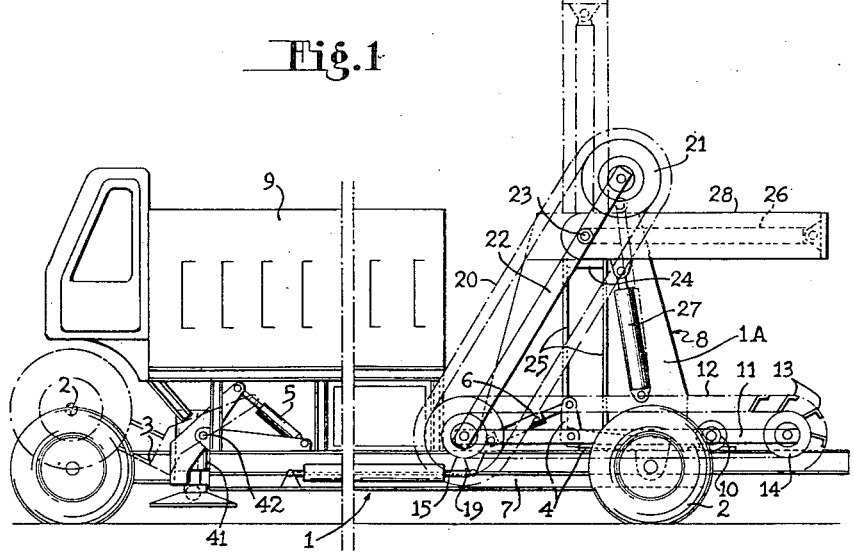
INVENTOR:
PIERRE JEAN-MARIE THEODORE ALLARD

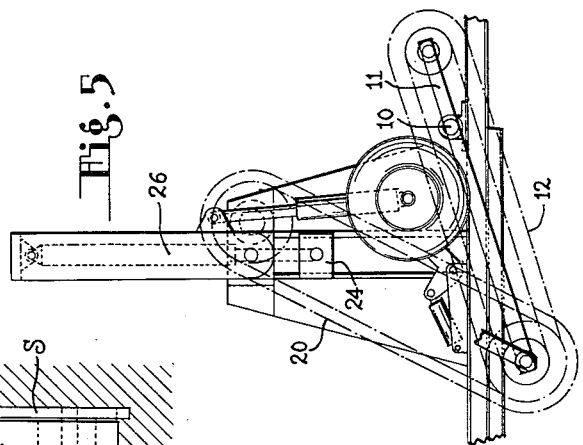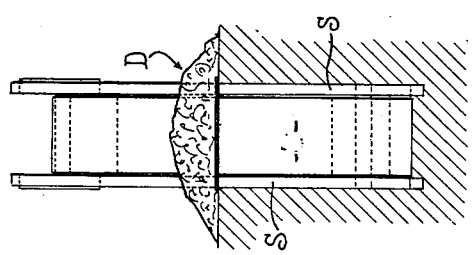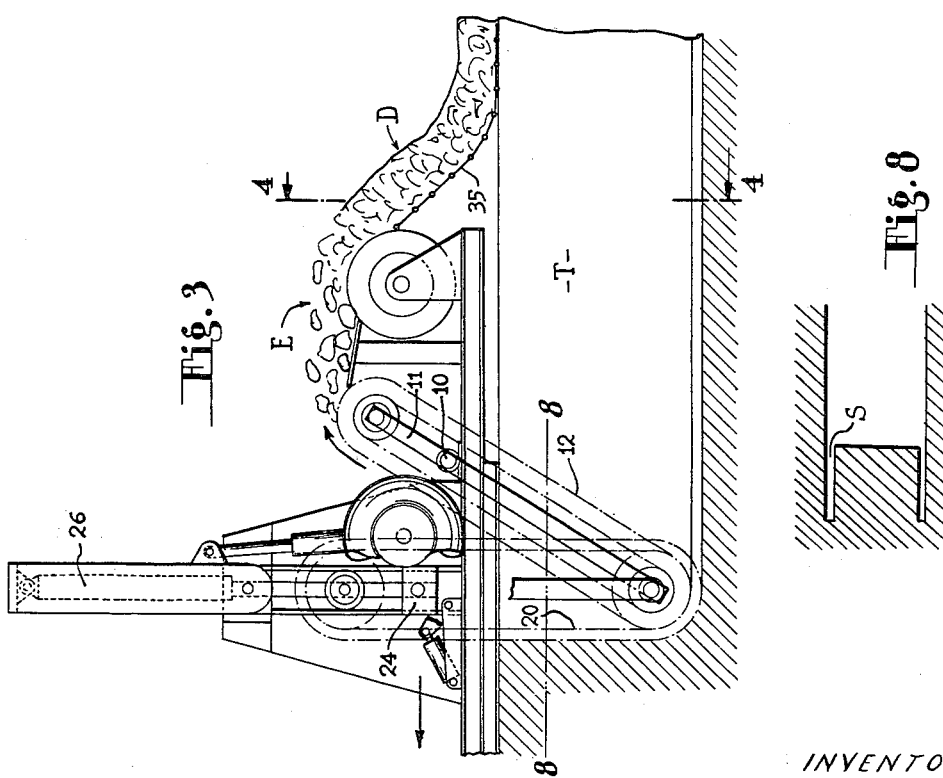

United States Patent Office 3,043,029
Patented July 10, 1962

3,043,029
EXCAVATING MACHINE NOTABLY FOR
DIGGING TRENCHES
Pierre Jean-Marie Theodore Allard, 8 Rue de Soisy,
Eaubonne, Siene-et-Oise, France
Filed Sept. 3, 1959, Ser. No. 837,966
Claims priority, application France Sept. 12, 1958
12 Claims. (Cl. 37—86)

The present invention relates to a high-power excavating machine mainly of use for forming trenches and effecting other similar earth works.

The object of the invention is to provide a machine of this type which permits extracting large amounts of ground while loosening or breaking up only a small part of the masses to extract, thus resulting in high efficiency as concerns both the ratio between the mass extracted and the energy consumed and the rate of work of the machine, that is, the mass of ground extracted per unit time.

The machine according to the invention comprises, disposed on a movable chassis, a pair of endless narrow cutting chains, said two chains being disposed in two parallel planes spaced apart from one another in such manner as to define between their outer edges a width which is substantially equal to that of the trench to be formed, and a third endless cutting chain whose width is substantially equal to that of the space between the said pair of chains, the latter being generally vertically disposed in their normal working position so as to effect vertical and parallel cuts forming the two sides of the trench and the third chain being inclined in its normal working position so that its lower end is capable of cutting into the base of the mass of ground between said cuts so as to cause said mass to collapse on to said third chain, and driving means for driving the chains.

The machine also has the following main features:
The two lateral chains are driven at a linear speed which is distinctly greater than that of the central chain;

Said pair of chains is capable of assuming in the vertical plane positions ranging from an inclined position to a vertical working position, and the third chain is capable of assuming positions ranging from a horizontal position to the inclined working position, the machine including supporting and control means permitting the regulation of these inclinations;

Said machine comprises a device permitting effecting a continuous thrust on said chains cutting the ground;

Said device could comprise a device permitting a step by step advance including raising means whereby the machine is raised, runways slidably mounted under the chassis and means for shifting the machine along said runways and for shifting the runways relative to the chassis;

Said step by step advance device is of the type in which the machine could be supported by wheels permitting its rapid transport, said wheels being steering or driving wheels;

The width of the chains is such and their working or cutting planes are so disposed that the major part of the force from the step by step device is applied to a section of ground which corresponds to only a small fraction of the section of the trench formed; preferably this fraction is about a third or a quarter so that the pressure exerted by the means cutting the ground is considerable;

Each of the three cutting chains comprises an endless chain held taut on two drums or pulleys which have parallel axes and are respectively supported by three beams, the axes of rotation of said pair of chains being aligned in pairs and one of the axes of rotation of the third chain coinciding with one of the axes of rotation of said pair of chains, whereby said third chain and said pair of chains form a unit pivotably mounted relative to a common axis.

The beam supporting the third chain could pivot on the chassis about an axis parallel with the axes of rotation of the chain, and the beams supporting the chains of said pair of chains being pivotable on slides guided by fixed vertical slideways.

It will be observed that owing to the aforementioned inclination of the central chain, the force exerted by the vertical jack, ram or fluid motor is partly transmitted to the shoes of the means through the medium of which the machine rests on the ground, in the form of vertical reactions which have for effect to considerably increase the pressure of these shoes thereby increasing the adherence of the latter. These shoes therefore constitute sure bearing points which are capable of absorbing the reactions of the rams causing penetration of the cutting tools into the ground.

The adherence of the shoes can be increased by providing the latter with points or spade elements which penetrate the ground.

Further features and advantages of the invention will be apparent from the ensuing description, with reference to the accompanying drawings to which the invention is in no way limited.

In the drawings:
FIG. 1 is a side elevational view of the machine according to the invention;
FIG. 2 is a plan view of the cutting device used in this machine;
FIG. 3 is an elevational view of the machine in its working position in the course of cutting a trench, this machine being provided with a device for automatically covering the trench;
FIG. 4 is a diagrammatic rear view of the machine taken along line 4—4 of FIG. 3;
FIG. 5 is a view of the cutting device in its working position at the start of trench cutting;
FIG. 6 is a view of a device mounted on the machine for permitting the latter to effect a turn;
FIG. 7 is a view of the device shown in FIG. 6 in another position, and
FIG. 8 is a sectional view taken along line 8—8 of FIG. 3 showing how the trench is cut as the machine advances.

In the embodiment shown in the figures, a movable chassis 1 is provided with a rolling device which could comprise wheels, articulated tracks or, better still, a step by step advance device. In the latter case, the machine comprises, for example, wheels 2 mounted on arms 3 and 4 which are shiftable by jacks, rams or fluid motors 5 and 6 so as to cause the machine to rest on the wheels 2 or on runways 7 which are slidably mounted under the chassis. In the latter position, the chassis could be caused to roll or slide along the runways 7 for example by a hydraulic jack 7a (FIG. 1) whose cylinder is connected to the runway and whose piston rod is connected to the chassis. Such a device is known and is described in the British Patent specification No. 819,797.

Mounted on this chassis, is the excavating machine proper 8 and a driving power unit 9 comprising, for example, a number of hydraulic compressors and electric or mechanical motors which drive these compressors. The machine could be adapted to be towed or could be self-propelling and in the latter case the unit 9 could also include the motor and transmissions for propelling the machine.

Fixed on the chassis is a pair of journals 10 about which is pivotably mounted a beam 11 supporting an endless chain 12 whose width is a little less than that of the trench it is proposed to cut into the ground. This chain is provided with cutting tools, such as tools 13, the shape of these tools varying in accordance with the nature of the ground to be worked. This chain is held taut between two drums or sprockets 14 and 15 which are journalled on both ends of the beam 11. The drum 14 is connected to driving devices constituted by hydraulic receiving devices or rotary hydraulic motors 16, connected to piping 17 supplying fluid under pressure and to an output piping 18.

Mounted on the shaft of the drum 15 are two rollers or sprockets 19—19 around which pass two cutting chains 20—20 which are much narrower than the chain 12 and are disposed on each side of the latter. These chains pass furthermore around a second pair of rollers or sprockets 21—21 on each side of the chain 12, the shaft of the rollers 19 and the shaft of the rollers 21 are interconnected by beams 22, which are parallel and pivotably mounted on pivots 23. Each of these pivots is mounted on a slide 24 which is itself guided by two vertical slideways 25—25. Two rams or fluid motors 26—26 which are disposed vertically when they are in their working position (see FIGS. 3 and 5 and the position shown in dot-dash line in FIG. 1) are connected to the slides 24 so as to control the vertical movements of the latter and consequently the movements of the beams 22. These rams are in their position for transport when tilted horizontally about the pivot 23 to the position shown in full line in FIG. 1.

The passage of these rams 26 from one position to the other is achieved by means of a ram or fluid motor 27 disposed between a fixed part 1A, rigid with the chassis 1, and the beams 28 supporting the rams 26.

The rollers 21 supporting the chains 20—20 are connected to driving devices such as hydraulic receivers or rotary hydraulic motors 29—29 connected to a supply pipe 30 supplying fluid under pressure and to a discharge pipe 31.

The chains 20 must be driven at a linear speed distinctly greater than that of the chain 12. If the rollers 19 are rigid with the same shaft as the drum 15 driven by a single motor unit, the differences between the linear speeds would be obtained by making the diameter of the rollers 19 greater than that of the drum 15. If, on the other hand, the drive of the pair of chains 20 and that of the chain 12 are independent, they could preferably consist in driving means having different and adjustable speeds so that, depending on the type of ground to be worked, the ratio between the two linear speeds can be increased or decreased in stages or in a continuous manner, the latter arrangement could also consist in a single driving means and a change-speed transmission.

The machine could also comprise an automatic change-speed device which automatically regulates the ratio between the speeds of the chains in accordance with the resistance the latter encounter, that is, the resistance of the ground.

Another device could be provided for automatically regulating, in accordance with the resistance of the ground, the advance of the chassis along its runways or for automatically retarding the pushing action of the hydraulic jack 7a on the chassis by automatically returning the fluid under pressure to the source of fluid.

The machine operates in the following manner:

During transport, the machine rests on its wheels, the rams 26 are moved to their horizontal position, the chain 12 is in its horizontal position and the chains 20 are in the inclined position corresponding to the raised position of the slides 24, as shown in FIG. 1.

To put the machine in its working position, the latter is lowered on to the ground by the rams 5 and 6, the driving devices of the three cutting chains 12 and 20—20 are started up and the latter are progressively urged into the ground by the action of the rams 26 and the weight of the machine. In the course of their work, the chains progressively pass to the intermediate positions such as those shown in FIG. 5, and then to their normal working position (FIG. 3). The machine is then propelled forwardly by its step by step advance device which causes it to move along the runways 7. It can be seen that the chains 20—20 cut narrow vertical and parallel trenches or channels S (FIGS. 4 and 8) in the ground whereas the lower end of the chain 12 works on the base of the ground between these channels.

Experience has shown that such a mass of ground which is no longer supported by its sides or base easily collapses onto the central chain 12 which raises it to the surface of the ground and evacuates it at E (FIG. 3). Thus only a small portion of the ground is cut compared to the volume of ground evacuated at E. This volume depends on the depth to which the chains 20—20 are lowered, the distance between these chains and the width of the chain 12. A roll 35 of an expanded metal strip or grid or of flexible wooden strips could be disposed behind the machine so as to unroll as this machine advances and cover the trench T and receive the broken-up excavated material, thereby forming a roof for this trench if necessary. This roof could be reinforced at intervals by means of wooden beams.

In the course of this operation, if the machine is provided with change-speed devices, the linear speeds of the chains and the speed of advance of the chassis are regulated as a function of the type of ground; this regulation is achieved either manually or, if desired, automatically.

This machine is preferably provided with a device enabling it to effect turns (FIGS. 6 and 7). This device consists in a ram or fluid motor 41 whose body is pivotably mounted at 42 in the vertical plane of symmetry of the chassis on members 1B rigid with the chassis 1 and is connected to the latter by rams or fluid motors 43—44 arranged transversely relative to the chassis 1. The rod of this ram 41 is connected to a shoe 45 capable of resting on the ground. In order to effect a turn, the ram 41 is actuated so as to slightly raise the forward end of the machine and thereafter the rams 43 and 44 are actuated in the directions for the desired turn, which brings the chassis in contact with the ground. The shoe 45 is then raised by the ram 41, the latter is then brought back to its vertical position and the same cycle of operations is repeated.

The machine of the invention could be constructed in forms resulting in very advantageous performances. The following figures are given by way of example.

A machine adapted to cut trenches two metres deep and one metre wide could have vertical cutting chains which are about 7 cm. wide. That portion of the central chain passing round the lower sprocket or roller which actually cuts into the ground extends round only about a quarter of the periphery of this roller, so that there is thus obtained a total working or cutting area which is less than one third of the section of the trench. For a given power, the pressure exerted on the portion of ground worked upon is therefore very much greater than with conventional machines which employ conventional methods, that is, cut into the ground over the entire area of the section of the trench.

With a 300 H.P. machine, it is possible in usual grounds, that is, in arable grounds with small amounts of stones, to obtain a speed of advance of one to two kilometres per hour.

The use of the step by step advance device also permits using this machine in grounds having a very soft outer surface.

Although specific embodiments of the invention have been described, many modifications and changes may be made therein without departing from the scope of the invention as defined in the appended claims.

In particular, the devices actuating the chains could be constituted by devices other than the rotary hydraulic motors and in particular by any suitable mechanical or electric driving devices. These devices are not necessarily disposed at both ends of the drums as shown in FIG. 2 but could be disposed at only one end of each drum. They could be replaced by a single actuating device disposed on the shaft common to the chains 20 and 19.

Further, certain pairs of elements could be replaced by a single element, for example the slides 24 could be replaced by a single central slide connected to the two beams 22 and controlled by a single ram 26.

Having now described my invention what I claim as new and desire to secure by Letters Patent is:

1. In an excavating machine for digging trenches comprising a chassis and means for propelling said chassis relative to the ground: two parallel lateral beams spaced apart from one another, two rollers rotatably mounted, respectively at one end of said lateral beams, on a common shaft, and, at the other end of said lateral beams, two further rollers mounted on aligned shafts whereby each of the lateral beams carries a pair of rollers which are spaced apart and have parallel axes of rotation, two lateral endless cutter chains respectively held taut on said pairs of rollers, a drum rotatably mounted on said pairs of rollers, a drum rotatably mounted on said shaft between said beams, a middle beam pivoted at one end on said shaft, a second drum mounted at the other end of said middle beam on an axis parallel to said shaft, a middle endless cutter chain held taut between said two drums; beam-supporting means connected to said chassis and said beams, for supporting said lateral and middle beams in an adjustable position; adjusting means for adjusting said position of said lateral and middle beams; first driving means operatively connected to said further rollers and second driving means operatively connected to said second drum for driving said lateral cutter chains and said middle cutter chain along their longitudinal axes.

2. In an excavating machine for digging trenches comprising a chassis and means for propelling said chassis relative to the ground: two parallel lateral beams spaced apart from one another, two rollers rotatably mounted, respectively at one end of said lateral beams, on a common shaft, and, at the other end of said lateral beams, two further rollers mounted on aligned shafts whereby each of the lateral beams carries a pair of rollers which are spaced apart and have parallel axes of rotation, two lateral endless cutter chains respectively held taut on said pairs of rollers, a drum rotatively mounted on said shaft between said beams, a middle beam pivoted at one end on said shaft, a second drum mounted at the other end of said middle beam on an axis parallel to said shaft, a middle endless cutter chain held taut between said two drums; beam-supporting means connected to said chassis and said beams, for supporting said lateral and middle beams in an adjustable position; adjusting means for adjusting said position of said lateral and middle beams; at least one first motor operatively connected to said further rollers, and one second motor operatively connected to said second drum, for driving said lateral cutter chains and said middle cutter chain along their longitudinal axes.

3. An excavating machine as claimed in claim 2 in which said motors are hydraulic motors.

4. In an excavating machine for digging trenches, comprising a chassis and means for propelling the chassis relative to the ground: two parallel lateral beams spaced apart from one another, two rollers rotatably mounted on a common shaft respectively at one end of said lateral beams, and, at the other end of said lateral beams, two further rollers mounted on aligned shafts whereby each of said lateral beams carries a pair of spaced apart rollers having parallel axes of rotation; two lateral endless cutter chains, respectively held taut on said pair of rollers, a first drum rotatably mounted on said shaft between said lateral beams, a middle beam pivoted at one end on said shaft, a second drum mounted on the other end of the middle beam, a middle endless cutter chain held taut between said first and second drums; a support shaft fixed relative to the chassis and rotatably supporting said middle beam at a point intermediate the ends of the latter, two fixed vertical slideways fixed to said chassis, two slides slidably mounted in said slideways, and pivotable means pivotably connecting said lateral beams to said slides respectively; adjusting and controlling means connected to said chassis and to said slide for controlling the movements of the slides along their respective slideways, to adjust the positions of said lateral and middle beams; and rotating means for rotating said further rollers and for rotating said second drum.

5. In an excavating machine for digging trenches, comprising a chassis and means for propelling the chassis relative to the ground: two parallel lateral beams spaced apart from one another, two rollers rotatably mounted on a common shaft respectively at one end of said lateral beams, and, at the other end of said lateral beams, two further rollers mounted on aligned shafts whereby each of said lateral beams carries a pair of spaced apart rollers having parallel axes of rotation; two lateral endless cutter chains, respectively held taut on said pair of rollers, a first drum rotatively mounted on said shaft between said lateral beams, a middle beam pivoted at one end on said shaft, a second drum mounted on the other end of the middle beam, a middle endless cutter chain held taut between said first and second drums; a support shaft fixed relative to the chassis and rotatably supporting said middle beam at a point intermediate the ends of the latter, two fixed vertical slideways fixed to said chassis, two slides slidably mounted in said slideways, and pivotable means pivotably connecting said lateral beams to said slides respectively; adjusting and controlling means connected to said chassis and to said slide for controlling the movements of the slides along their respective slideways, to adjust the positions of said lateral and middle beams; first rotating means for rotating said further rollers, and second rotating means for rotating said second drum.

6. Excavating machine as claimed in claim 5, wherein said adjusting and controlling means comprises a hydraulic jack connected to said chassis and to said slides.

7. Excavation machine as claimed in claim 6, wherein said hydraulic jack is, in its working position, vertically disposed above the slides, and mounted on a pivotable support in such manner as to be capable of being moved to a horizontal position for transport on the road.

8. In an excavating machine comprising a chassis and propelling means for propelling said chassis in a direction of advancement; rotatably mounted on said chassis: a middle endless cutter chain inclined downwardly and forwardly relative to said direction of advancement, a pair of lateral endless cutter chains narrower than said middle endless cutter chain, arranged in vertical planes parallel with said direction of advancement, on each side of said middle endless cutter chain, each of said chains having a forward plane to engage and attack the ground; a common horizontal axis on which the lower forward portion of said middle endless cutter chain and the lower portion of each of said lateral endless cutter chains are rotatably mounted, and two separate horizontal axes on which are mounted, respectively, on the one hand the rear upper portion of said middle endless cutter chain, and, on the other hand, the upper portion of each of said lateral endless cutter chains, the forward planes of the lateral chains being ahead of the forward plane of the middle chain.

9. In an excavating machine for digging trenches, comprising: a movable chassis, and thrust means carried by said chassis for exerting a thrust on said chassis in a direction of advancement; first chain-supporting means carried by said chassis and inclinable in a downward and forward direction relative to said direction of said thrust, a middle endless cutter chain rotatably supported by said first chain-supporting means, a pair of second chain-supporting means carried by said chassis, in vertical planes, respectively on each side of said middle endless chain and inclinable between a downward and forward position and a vertical position, a pair of lateral endless cutter chains rotatably supported by said pair of second chain-supporting means; said first chain-supporting means and said pair of second chain-supporting means being pivotably assembled together at the lower forward end of said middle endless cutter chain and the lower forward ends of said lateral endless cutter chains; and first and second chain-driving means for driving said middle endless cutter chain and said pair of lateral endless cutter chains, respectively along their longitudinal axes.

10. In an excavating machine for digging trenches, comprising a chassis and thrust means carried by said chassis for exerting a thrust on said chassis in a direction of advancement; rotatably mounted on said chassis: a middle endless cutter chain inclined downwardly and forwardly relative to said direction of advancement, a pair of lateral endless cutter chains narrower than said middle endless cutter chain, arranged in vertical planes parallel with said direction of advancement, on each side of said middle endless cutter chain, each of said chains having a forward plane to engage and attack the ground; a common horizontal axis on which the lower forward portion of said middle endless cutter chain and the lower portion of each of said lateral endless cutter chains are rotatably mounted, and two separate horizontal axes on which are mounted, respectively, on the one hand, the rear upper portion of said middle endless cutter chain and, on the other hand, the upper portion of each of said lateral endless cutter chains, the forward planes of the lateral chains being ahead of the forward plane of the middle chain; said thrust means comprising a step-by-step advance device for driving the machine along said direction, said device comprising arms pivotably mounted on said chassis, wheels rotatably mounted on said arms, said wheels being capable of supporting the machine and permitting the rapid transport of the latter, raising jacks connected to said chassis and said arms, runways slidably mounted under the chassis, and means for moving the machine along said runways, and for moving the latter relative to the chassis when said chassis is supported by said wheels.

11. In an excavating machine for digging trenches, comprising a chassis and a propelling device for propelling said machine step-by-step relative to the ground so as to exert a thrust in a direction of advancement; rotatably mounted on said chassis: a middle endless cutter chain inclined downwardly and forwardly relative to said direction of advancement, a pair of lateral endless cutter chains narrower than said middle endless cutter chain, arranged in vertical planes parallel with said direction of advancement, on each side of said middle endless cutter chain, each of said chains having a forward plane to engage and attack the ground; a common horizontal axis on which the lower forward portion of said middle endless cutter chain and the lower portion of each of said lateral endless cutter chains are rotatably mounted, and two separate horizontal axes on which are mounted, respectively, on the one hand the rear upper portion of said middle endless cutter chain and, on the other hand, the upper portion of each of said lateral endless cutter chains, the forward planes of the lateral chains being ahead of the forward plane of the middle chain; and a raising jack fixed under the machine, in the longitudinal plane of symmetry of the chassis, comprising a body connected to the chassis, on the one hand by a pivot pin, and on the other hand, by two horizontal jacks transversely arranged on each side of said raising jack and connected to said chassis, whereby said machine can effect turns of small radius.

12. In an excavating machine for digging trenches, comprising: a movable chassis, and thrust means carried by said chassis for exerting a thrust on said chassis in a direction of advancement; first-chain supporting means carried by said chassis and inclinable in a downward and forward direction relative to said direction of said thrust, a middle endless cutter chain rotatably supported by said first chain-supporting means, a pair of second chain-supporting means carried by said chassis, in vertical planes, respectively on each side of said middle endless chain and inclinable between a downward and forward position and a vertical position, a pair of lateral endless cutter chains rotatably supported by said pair of second chain-supporting means; said first chain-supporting means and said pair of second chain-supporting means being pivotably assembled together at the lower forward end of said middle endless cutter chain and the lower forward ends of said lateral endless cutter chains; first and second chain-driving means for driving said middle endless cutter chain and said pair of lateral endless cutter chains, respectively along their longitudinal axes; and, arranged on the rear part of the machine, a support for supporting a roll of flexible band which is capable of being unrolled on the top of the trench for receiving the broken-up excavated ground.

References Cited in the file of this patent
UNITED STATES PATENTS

| | | |
|---|---|---|
| 1,317,697 | French | Oct. 7, 1919 |
| 1,723,691 | Farrar | Aug. 6, 1929 |
| 1,777,439 | Lamont | Oct. 7, 1930 |
| 2,031,279 | Newman | Feb. 18, 1936 |
| 2,415,217 | Osgood | Feb. 4, 1947 |
| 2,735,667 | Potvin | Feb. 21, 1956 |
| 2,828,557 | Brown | Apr. 1, 1958 |
| 2,914,127 | Ricouard | Nov. 24, 1959 |
| 2,942,676 | Kraus | June 28, 1960 |